US007392050B2

(12) United States Patent
Svensson et al.

(10) Patent No.: US 7,392,050 B2
(45) Date of Patent: Jun. 24, 2008

(54) SYSTEMS AND METHODS FOR AUTOMATED NETWORK OPERATING CENTER SYSTEM FOR BROADBAND WIRELESS NETWORK

(75) Inventors: Lars Olof Hugo Svensson, Plymouth, MN (US); Karl-Johan Yngve Torarp, Minneapolis, MN (US)

(73) Assignee: Schwegman, Lundberg & Woessner, P.A., Minneapolis, MN (US)

( * ) Notice: Subject to any disclaimer, the term of this patent is extended or adjusted under 35 U.S.C. 154(b) by 283 days.

(21) Appl. No.: 10/837,898

(22) Filed: May 3, 2004

(65) Prior Publication Data

US 2005/0185607 A1 Aug. 25, 2005

Related U.S. Application Data

(60) Provisional application No. 60/547,518, filed on Feb. 25, 2004.

(51) Int. Cl.
*H04Q 7/20* (2006.01)
(52) U.S. Cl. .................. 455/435.3; 455/435.2; 455/411; 455/410; 455/452.2; 455/524; 455/525; 455/422.1; 370/328; 370/338; 370/465
(58) Field of Classification Search .............. 455/435.3, 455/435.2, 422.1, 452.2, 411, 410, 524; 370/328–338
See application file for complete search history.

(56) References Cited

U.S. PATENT DOCUMENTS 6,522,641 B1 2/2003 Siu et al.

(Continued)

OTHER PUBLICATIONS

"U.S. Appl. No. 10/837,909, Non-Final Office Action mailed Feb. 2, 2007", 11 p.

(Continued)

*Primary Examiner*—Rafael Perez-Gutierrez
*Assistant Examiner*—Khai Nguyen
(74) *Attorney, Agent, or Firm*—Schwegman, Lundberg & Woessner, P.A.

(57) ABSTRACT

Disclosed herein are methods and apparatus for operating and deploying a broadband wireless network having at least one data transmission node and a plurality of CPE units, wherein there is a wireless data link at least in part between the data transmission node and the CPE units, and further wherein the management and configuration of the network is managed centrally and at least one of authorization, authentication, data stream prioritization or queuing is accomplished through the operation of the CPE units. According to one embodiment there is provided a user group manager that provides a user interface for at least one local service provider to manage information about end users served by the local service provider. In another embodiment, management and configuration of the network is managed using a device that communicates with CPE units and the data transmission nodes. The system and method further provides a data transmission node that includes routing capability, wherein the data transmission node is located with at least one CPE unit. In another embodiment, a network supervision and management device holds an original configuration file for each CPE unit wherein each CPE unit further includes a configuration file that includes an address reference to one or more of the supervision and management devices thereby providing for connectivity to the supervision and management devices and capability of redundancy when more than one supervision and management device is referenced.

9 Claims, 7 Drawing Sheets

U.S. PATENT DOCUMENTS

| | | | |
|---|---|---|---|
| 7,042,988 B2 * | 5/2006 | Juitt et al. | 379/88.17 |
| 7,068,597 B1 | 6/2006 | Fijolek et al. | |
| 7,075,912 B2 * | 7/2006 | Suda et al. | 370/331 |
| 2002/0054578 A1 * | 5/2002 | Zhang et al. | 370/328 |
| 2002/0166117 A1 | 11/2002 | Abrams et al. | |
| 2003/0138029 A1 | 7/2003 | Gerard | |
| 2004/0132438 A1 | 7/2004 | White | |
| 2004/0228336 A1 | 11/2004 | Kung et al. | |
| 2005/0113120 A1 | 5/2005 | Rappaport et al. | |
| 2005/0185611 A1 | 8/2005 | Torarp et al. | |
| 2005/0185622 A1 | 8/2005 | Svensson et al. | |
| 2005/0185656 A1 | 8/2005 | Svensson et al. | |
| 2006/0050721 A1 * | 3/2006 | Ganesan | 370/401 |

OTHER PUBLICATIONS

"U.S. Appl. No. 10/837,910, Non-Final Office Action mailed Sep. 10, 2007", 13 p.

"U.S. Appl. No. 11/066,906, Non-Final Office Action mailed Jul. 6, 2007", 11 p.

* cited by examiner

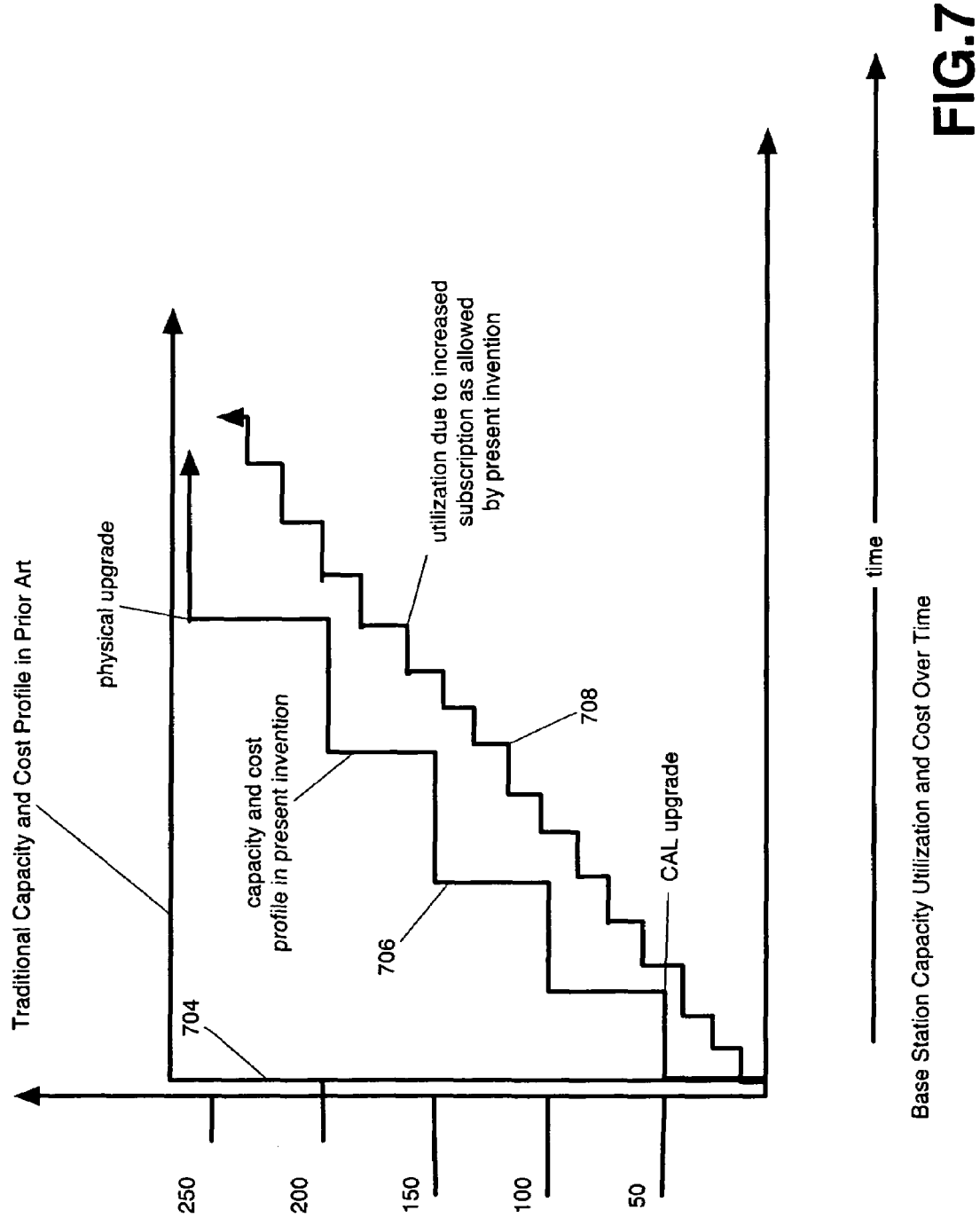

US 7,392,050 B2

SYSTEMS AND METHODS FOR AUTOMATED NETWORK OPERATING CENTER SYSTEM FOR BROADBAND WIRELESS NETWORK

RELATED APPLICATIONS

This application is a non-provisional application claiming benefit under 35 U.S.C. § 119(e) of U.S. Provisional Application No. 60/547,518, entitled "SYSTEMS AND METHODS FOR BROADBAND WIRELESS NETWORK," filed Feb. 25, 2004, which is incorporated herein by reference.

This application is related to U.S. patent application Ser. No. 10/837,909, entitled "SYSTEMS AND METHODS FOR ANONYMOUS COMMINGLING OF SERVICE PROVIDER'S SUBSCRIBERS ON A BROADBAND WIRELESS NETWORK", filed May 3, 2004; this application is related to U.S. patent application Ser. No. 10/837,910, entitled "SYSTEMS AND METHODS FOR CENTRALIZED CONTROL AND MANAGEMENT OF A BROADBAND WIRELESS NETWORK WITH DATA PROCESSING, AND ENFORCEMENT DISTRIBUTED TO THE NETWORK EDGE", filed May 3, 2004, each of which is incorporated herein by reference.

TECHNICAL FIELD

The inventive subject matter disclosed herein relates generally to methods of providing network connectivity to broadband wireless carriers and in particular to a system of wireless network access for end users of such broadband wireless carriers.

BACKGROUND

Currently deploying broadband wireless network access to end-users is expensive and requires substantial capital investment on the part of the carrier. The broadband wireless carrier moves the data the last miles from the higher-speed backbone to the end user location. Today, those last miles carriers include telephone companies, cable companies, and satellite providers. These providers typically require a 36 to 60 month return on investment. Current wireless Internet service providers (ISPs) and other broadband wireless carriers typically can achieve 18 to 24 month return on investment. Even this shorter period, however, is a barrier to widespread use and adoption of wireless broadband access. As a result, the broadband penetration in the United States is lower than it is in comparable industrialized nations.

Penetration could be improved if there was available a low cost solution for broadband wireless carriers that allows them to incrementally increase their operating costs as they need more capacity. Ideally, such a system would be incrementally expandable in capacity so that the cost of the system also grows incrementally. Thus, the broadband wireless carrier would pay proportionally to the size and use of the system so that the associated capital investment is always used efficiently.

Return on investment solutions for broadband wireless networks come from increased revenue, reduced total cost of ownership and operation, and by arranging the wireless network business to achieve earlier revenue and/or achieve a delay in expense. Ideally, the solutions let the broadband wireless network operator sign up subscriptions for revenue larger than total cost at all time from the start of the business.

One major component of the initial investment for a broadband wireless network is provision of local network operating center support with local or on-site supervision, control, and maintenance of the broadband wireless network.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 7 is a diagram of capacity, cost and utilization profiles according to an embodiment of the inventive subject matter disclosed herein.

DESCRIPTION OF THE EMBODIMENTS

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the inventive subject matter disclosed herein. Therefore, the following detailed description is not to be taken in a limiting sense, and the scope of the inventive subject matter disclosed herein is defined by the appended claims and their equivalents.

Figure 1:
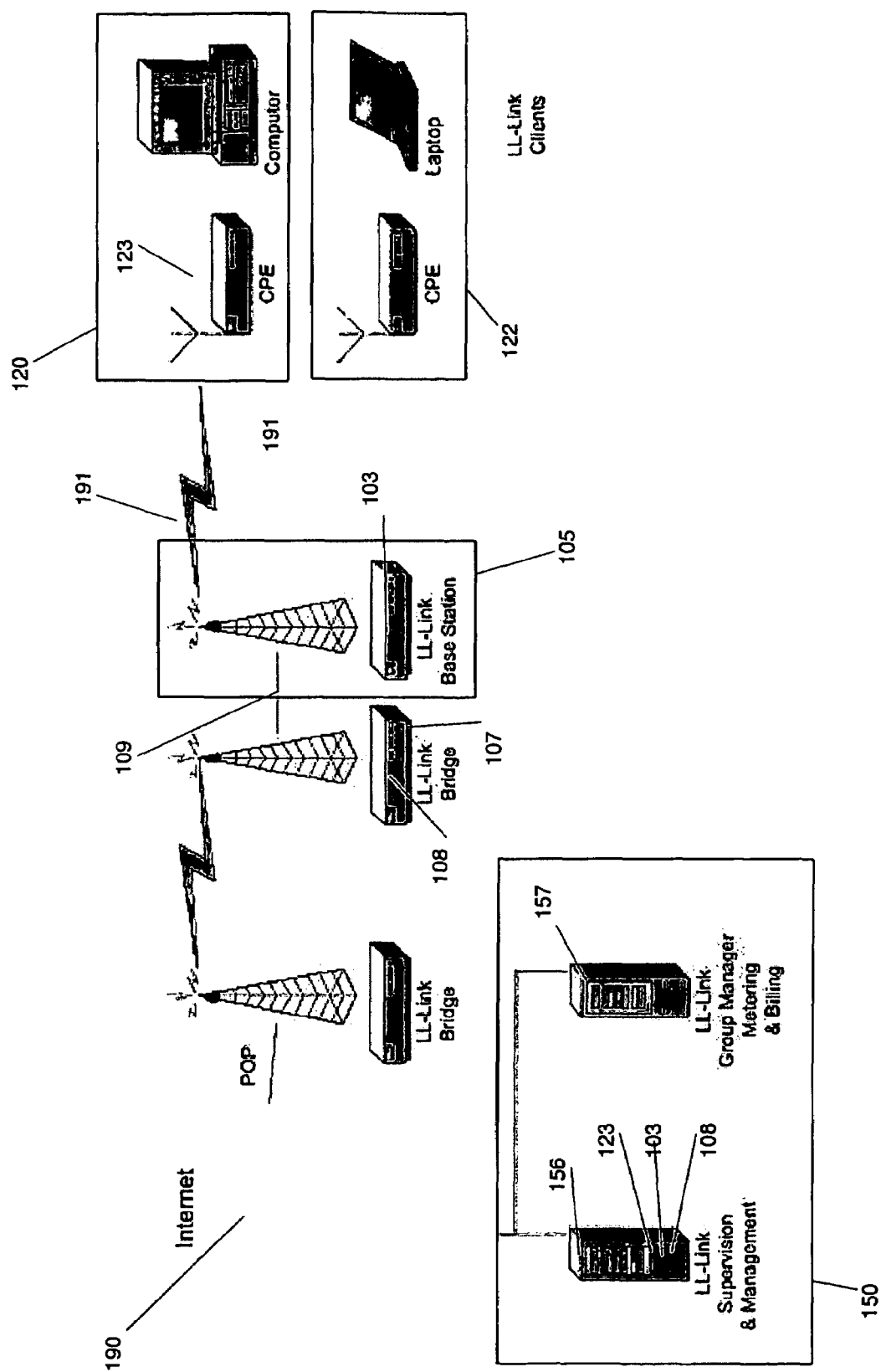
FIG. 1 is an exemplary schematic illustration of a system of network connectivity according to an embodiment of the inventive subject matter disclosed herein.

FIG. 1 is an exemplary schematic illustration according to an embodiment of the inventive subject matter disclosed herein. FIG. 1 illustrates one example embodiment of a broadband wireless network for the provision of broadband wireless access to end-users. As used herein, the term "broadband wireless carrier" is the entity that operates the broadband wireless network while the term "local service provider" refers to entities that sell or distribute data transfer capacity on the broadband wireless network to end users. Such local service providers may be the broadband wireless carrier, or one or several of ISPs or wireless ISPs, or any other seller and/or distributor of such services. A network system according to the teachings of the inventive subject matter disclosed herein includes, but is not limited to, at least one customer premises equipment (CPE unit) 120, at least one base station 105, a communications link 121 connecting the at least one base station to at least one CPE unit, at least one network operating center (NOC) 150, a communications link connecting the NOC 150 to the at least one base station 105 and devices at the NOC for the supervision and management of the network 156 and for the provisioning of the network 157. The Base Station 105 is connected to a transmitter/receiver, also known as a transceiver, unit 106. It will be recognized to those skilled in the art that reference to a base station can include reference to such a transceiver 106. The Base Station 105 routes data to at least one of a plurality of customer premise equipment (CPE unit) units 120. The Base Station routes the data from a network, such as the Internet 190 or any other network such as a private network, through a communications link 121 to the CPE unit 120. In yet another example embodiment, the base station is connected via a communications module to the Internet 190 directly. In another example embodiment, the base station is connected through the transceiver 106 to some other base station 107 via some link 109. In still another example embodiment, the communications link 121 between the base station 105 and the CPE unit 120 is a wireless link. According to one example embodiment the CPE is mounted in or on a subscriber premises. According to yet another embodiment, the CPE may be mobile, for example carried on person or on vehicle or by any other means of mobility.

Reference in the description is made to a configuration file, which is herein defined as a file that maintains settings by which a device communicates on the network and/or operates. A policy is a subset of such a configuration file and is defined as a parameterization of settings that affect the end user experience, such as, but not limited to, bandwidth settings, quality of service or class of service. The network supervision and management device 156 at NOC 150 holds an original configuration file 123-*o* for each CPE unit 120, an original configuration file 103-*o* for each base station 105 and an original configuration file 108-*o* for each bridge 107. Each of these respective devices holds a current, active configuration file 123, 103 and 108, respectively. As further described below, these files are used to configure their respective components. All these configuration files contain address references to one or more NOCs 150 thereby providing for connectivity to the central management system and capability of NOC redundancy when more than one NOC 150 is referenced in one configuration file.

As used herein, the term "CPE unit" refers to a device or other electronic module or system, for instance constructed with special purpose or general purpose circuits or software, that is used for enabling access to a data service such as broadband service, for example through a base station 105, and that is located at the end user subscriber's premises. Such a CPE unit (120 or 620 for instance) may be a stand-alone device, or may be integrated into another device, or otherwise constructed.

In one more example embodiment, the wireless link is made in accordance with the 802.16a standard of the IEEE or any equivalent, compatible, superceding or alternate standard. Moreover, the inventive subject matter disclosed herein is in no way limited to the 802.16a standard, and in fact any other wireless standard or protocol may be used. To manage the connections and accounting, software applications on devices at a NOC 150 are provided. In yet one more example embodiment supervision and management of network services is handled by a supervision and management device. In still another example embodiment, provisioning of network services is handled by a provisioning management device. In yet still another example embodiment the functions of network supervision and management and provisioning management are handled by a single device. In still another example embodiment, the NOC 150 serves multiple broadband wireless carriers. In yet another example embodiment, the NOC 150 is a leased service from an organization other than the broadband wireless carriers. In another example embodiment, the provisioning management device is located at some location other then the NOC 150. In accordance with yet still another example embodiment, the network supervision and management device 156 receives authentication requests from a CPE unit 120 over the network. After the network supervision and management device 156 properly authenticates the CPE unit 120, it will send to the CPE unit 120 a configuration file. The CPE unit 120 will configure itself according to this configuration file and subsequently be configured to provide network services to the customer.

According to one embodiment, each CPE unit 120 is dynamically or statically assigned an Internet protocol (IP) address, and also assigned a media access control (MAC) address unique to the CPE unit. In still another example embodiment each CPE unit 120 may have a permanent CPE unit identification (ID) that is unique to the device.

In still another example embodiment, the base station 105 maintains a client access list with which it limits the number of possible users accessing the base station 105 through the transceiver 106. It is advantageous to maintain such a list as when users that would overload the bandwidth capacity of the transceiver 106 and the base station 105 are connected to the network, the quality of service of everyone connected to the base station 105 may be affected. This client access list, though maintained at the base station 105 is managed by the network supervision and management device 156 through some software application. In yet one more example embodiment, when a new CPE unit 122 attempts to connect to the network, the authentication session will identify the CPE unit 122 as a new CPE unit 122. The network supervision and management device will verify that the base station 105 has sufficient bandwidth capacity and if so, will then allow the new CPE unit 122 to connect to the network, and add the new CPE unit 122 to the base station client access list, providing the updated base station client access list to the base station 105. In still another example embodiment, the base station 105 will allow a limited connection for CPE units not in the base station client access list. This limited connection may be limited to a connection with the network supervision and management device 156 for the purpose of verification that the new CPE unit 122 can be added to the base station client access list.

In one example embodiment, the client access list is maintained at the NOC and through downloading of a unique configuration file to the CPE unit 122, and network access is enforced at the CPE unit 122. In still another example embodiment, the client access list is maintained on the network supervision and management device at the NOC. In one more example embodiment, when a new CPE unit 122 attempts to connect to the network, the system account ID authentication session will identify the CPE unit 122 as a new CPE unit 122. The network supervision and management device 156 will verify that the capacity of the base station is sufficient given the broadband wireless carrier's current service agreement. If the addition of the CPE unit will exceed the capacity of the broadband wireless carrier's current service agreement, the network supervision and management device will automatically upgrade the client access list, allowing the new CPE unit 122 to be added to such list. In such an example, the network supervision and management device 156 will communicate to the provisioning management device 157 that an upgrade for a particular base station's client access list, as maintained by the NOC, has occurred. The provisioning management device will communicate an invoice or other such billing device to the local service provider who has added the new CPE 122.

In yet one more example embodiment consistent with network access enforcement at the CPE unit 122, the base station 105 is a simple and low cost device. This is possible due to the low performance requirements of the base station according to the teachings of the inventive subject matter disclosed herein. The base station needs to perform minimal routing operations and monitor the authentication of packets from a CPE unit on the network.

In still another example embodiment, the network supervision and management device 156 functions include, but are not limited to, monitoring the network of the local service providers and the broadband wireless carriers, responding to unexpected conditions in the network of the local service providers and the broadband wireless carriers, remotely upgrading the hardware or software of the network, including the hardware or software of the bridge 107, base station 105, and the CPE unit 120, monitoring the usage of the network over time and predicting future over-subscription conditions, reporting future over-subscription conditions, maintaining current hardware or software versions for base stations deployed on the network, and maintaining current hardware or software versions for CPE unit's deployed on the network.

In yet still another example embodiment, a hardware upgrade may mean some permanent, irreversible change to the configuration of a device. This may include, but not be limited to, actual physical upgrades of devices, burning of firmware onto a hardware device, either locally or remotely, or burning a fuse link of a device, either locally or remotely.

In yet one more example embodiment, the network supervision and management device 156 is remotely accessible from a software application, which may be termed, without limitation, as a User Group Manager (UGM), accessed by a broadband wireless carrier, or local service provider, such that the local service provider, while using the UGM, can configure the settings for a particular CPE unit 120 remotely without any assistance from personnel at the NOC 150 or from any broadband wireless carrier. The UGM may be deployed on a separate server and may be enabled for access by a web browser. The UGM helps alleviate the concern of local service providers of network access, such as local service providers, involved in a relationship where their customers are commingled on the same network with customers of a different local service provider. This concern is that the broadband wireless carrier must maintain a list of users for the purposes of authentication for access to the network. This list would include all users, not just users of a particular local service provider, such that one local service provider's customer list may be accessible to a competing local service provider. Use of the system disclosed herein eliminates the possibility and removes that concern by physically separating the personally identifiable information of users for different local service providers. The network supervision and management device maintains a list of System Account ID's and CPE unit ID's, not a list of users. The CPE unit configuration file for the CPE unit of a particular end user is maintained with the ID of the CPE unit, and the System Account ID, not an identification of the user, so the CPE unit data is anonymous with respect to the end user. In one example embodiment, a user may have multiple System Account ID's for a single CPE unit ID. In another embodiment the user may have multiple CPE unit ID's for one System Account ID's. The System Account ID provides for easy swap out of a CPE unit at the end user location. Such a swap out might occur when the CPE unit fails and is replaced under a service agreement or warranty. The end user when powering up the new CPE unit initially will authenticate their System Account ID to the network supervision and management device at the NOC. Following a successful authentication, the network supervision and management device will provide to the CPE unit the proper configuration settings given the user's current level of service with their local service provider. The UGM maintains a customer listing and when connecting to the network supervision and management device, will match up a particular end user with their respective System Account ID, such that the current configuration settings for that end user may be retrieved by the network supervision and management device and communicated to the UGM. In another example embodiment this communication between UGM and network supervision and management device is encrypted.

Figure 2:
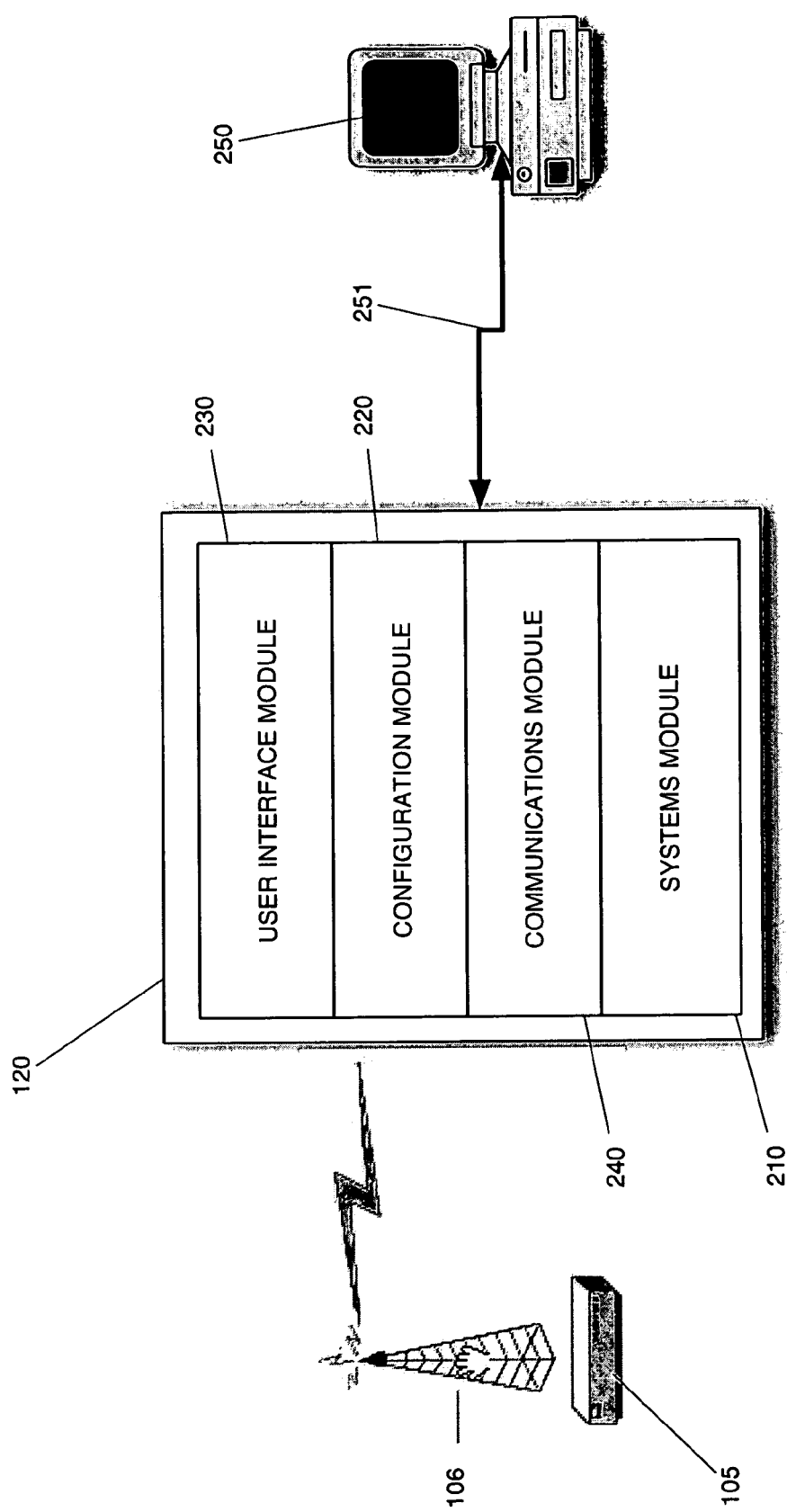
FIG. 2 is a simple block diagram of a device according to an embodiment of the inventive subject matter disclosed herein.

In FIG. 2 a simple block diagram of a CPE unit 120 according to an embodiment of the inventive subject matter disclosed herein is provided. The CPE unit 120 includes, but is not limited to, a system module 210, a configuration module 220, a user interface module 230 and a communications module 240. The configuration module 220 and the user interface module 230, though shown as actual physical modules in FIG. 2, may be software applications that run on the system module 210 and which connect to the network through the communications module 240. In still another example embodiment, the configuration module 220 maintains a local configuration file with which to inform the systems module and the communications module 240 how to connect to the network and with what settings. In accordance with yet still another example embodiment the local configuration file maintains a parameterization of the user experience. This parameterization may include, but not be limited to, guaranteed bandwidth, burst bandwidth, quality of service, class of service, and user identification information. It is to be understood that any aspect of the user experience that can be defined may be included in the configuration file.

In still another example embodiment, an end user may select some guaranteed bandwidth setting which is lower then the burst bandwidth settings. For example, the end user may require that they receive a network connection that is guaranteed to be no lower then 256 kbps. This end user would always receive at least that network speed, irrespective of the number of users currently accessing the base station, or the capacity utilization of the base station. The base station will also have the capacity to handle network speeds for end users above their guaranteed bandwidth settings, as provided for by the burst bandwidth settings of the CPE unit. The CPE unit will slow network traffic down to ensure that the burst bandwidth is never exceeded, enforcing the configuration file at the edge of the network. In one more example embodiment, the network supervision and management device, along with the provisioning management device, at the NOC will monitor the capacity utilization of the base station as new CPE unit's are authenticated onto the network. These devices will set some predefined percentage of theoretical bandwidth capacity of a base station. In the addition of CPE unit's or changes to existing CPE unit's configuration files, the devices will ensure that the aggregate of the guaranteed bandwidth of all CPE unit's accessing a base station never exceeds this percentage. In still another example embodiment, the broadband wireless carrier determines what this percentage is. CPE unit's communicating with the network may operate at network speeds in excess of their guaranteed bandwidth, provided that bandwidth utilization by other CPE unit's accessing the same base station allows for it.

In yet one more example embodiment, the configuration module 220 is accessible by the user of the CPE unit 120 through a user interface module 230. In yet one more example embodiment, the user interface module 230 configures and sends a web browseable file to the user's computer 250, which is connected over some communications link 251 to the communications module 240 of the CPE unit 120. In yet still another example embodiment, the user has the ability to modify the local configuration file via the web browseable interface. In another example embodiment, a modification of the local configuration file via the web browseable interface will cause the system module 210 to communicate with the network supervision and management device 156 at a NOC 150 and report the change to the local configuration file. The network supervision and management device 156 will change the configuration file original 123-*o* that it maintains, in accordance with the local configuration file, and any changes in the configuration file that will necessitate a change in billing will be reported to an provisioning management device, such as an provisioning management device 157 at a NOC, though such a device need not be located at the NOC 150. In still another example embodiment, the provisioning management device can communicate the change of service to the broadband wireless carrier, enabling the broadband wireless carrier to invoice the end user for the increased service. In this fashion, any user can self-initiate an upgrade or downgrade in the service they desire and simply be billed for the increase or decrease with their regular invoice from the local service provider.

In yet one more example embodiment, the CPE unit 120 can provide voice services for the end user. Traditionally voice services have been provided for by traditional analog connections to some telecommunications provider. Voice-over-IP (VoIP) services have become available where a user's traditional phone service is provided by some network device. In accordance with yet still another example embodiment, the CPE unit 120 is configured to provide VoIP services to the end user. VoIP services are required to be highly available. Additionally, a certain quality of service must be provided to the end user. The policy management performed by the CPE unit 120 accomplishes this functionality. By being configured to handle VoIP for a particular end user, that particular end-user's CPE unit policy will have configuration data that represents that additional service.

In still another example embodiment, the CPE unit handles data stream priority and queuing as defined in the CPE unit configuration file. As other information services such as video conferencing or high-definition video streams are added, the configuration file maintained and enforced by the CPE unit 120 may be modified to reflect the data requirements of those additional services. In one more example embodiment, the system module 210 further includes an upgrade functionality. The system module 210 can monitor the current version of the hardware installed in the CPE unit 120 and can request a hardware upgrade when such version becomes outdated. In one more example embodiment, the network supervision and management device 156 at the NOC monitors the current hardware version of all CPE units. The network supervision and management device being appraised of a hardware upgrade being made available will initiate the upgrade of CPE unit hardware affected or the CPE will initiate such a startup during system boot up condition. In still another example embodiment, this upgrade occurs automatically, without any end user on-site intervention. In yet one more example embodiment, management of this upgrade process is performed centrally, such as at a NOC by a network supervision and management device. In yet one more example embodiment, management of this upgrade process is distributed to the various local service providers.

Figure 3:
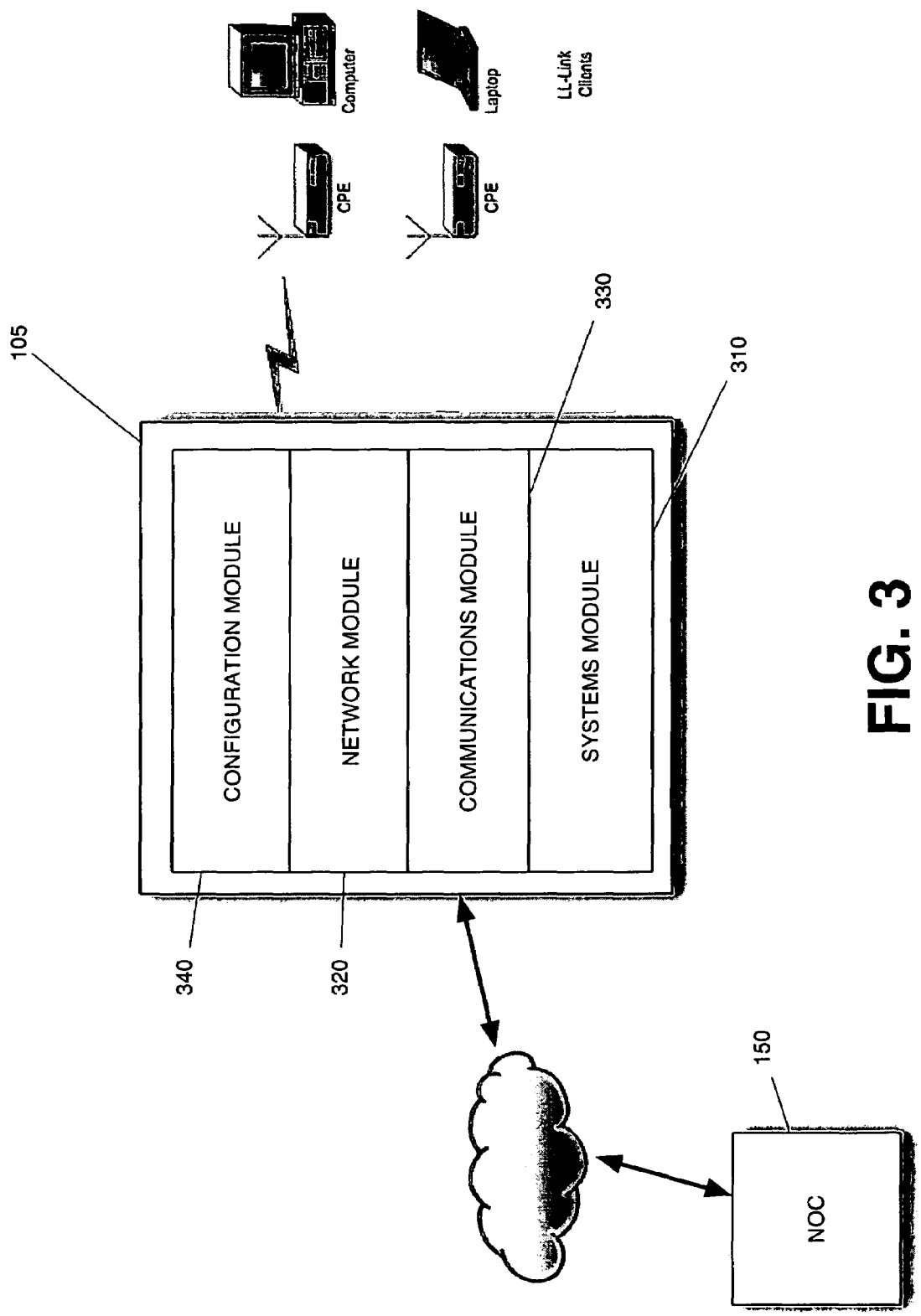
FIG. 3 is a simple block diagram of a device according to an embodiment of the inventive subject matter disclosed herein.

In FIG. 3 a simple block diagram of a base station 105 according to an embodiment of the inventive subject matter disclosed herein is provided. The base station 105 includes, but is not limited to, a system module 310, a network module 320, a communications module 330 and a configuration module 340. The configuration module 340, though shown as an actual physical module in FIG. 3, may be a software application that runs on the system module 310 and which connects to the network through the network module 320. In yet one more example embodiment, the configuration module 340 maintains, among other things, a client access list detailing which CPE unit's are allowed access to the network services provided by the base station 105. In another example embodiment, the configuration module 340 may be accessed by the network supervision and management device 156, at the NOC 150, and updated according to configuration changes of CPE units, similar to that described above. In one more example embodiment, the network supervision and management device 156 monitors the number of CPE units that are currently allowed access to a base station 105. As the local service providers deploy CPE units, the network supervision and management device 156 can update the base station configuration file remotely through the communications module 330 of the base station 105.

In one embodiment, the network supervision and management device 156 determines whether the current capacity of the base station is sufficient given a change in utilized capacity. In another embodiment, a change in the utilized capacity may be caused by a change in the client access list maintained by the base station 105. In yet another embodiment, a change in the utilized capacity may be caused by a change in the client access list for a base station 105 as maintained by the network supervision and management device at the NOC. If a determination by the network supervision and management device 156 shows that the current capacity is not enough, a change to the client access list of the base station may be made. In still another embodiment, this can also result in a communication from the network supervision and management device 156 to some provisioning management device 157 of the change, further resulting in an invoice being automatically sent from a capacity licensing agent to the broadband wireless carrier for the increased level of services being provided. A capacity licensing agent may be, for example, the vendor of the system equipment or anyone authorized to grant such licenses. Accordingly, the broadband wireless carrier will pay for increased base station capacity using this licensing mechanism. In still another example embodiment, capacity may be defined as any of the following, bandwidth allocation, number of subscribers, concurrent users or concurrent data streams or other quantifiable measures of capacity. In yet still another example embodiment, capacity may be some combination.

In accordance with yet still another example embodiment, the network supervision and management device 156 will estimate, based on historical data, if the available capacity of the base station 105 will be exceeded at some point in the future. The base station hardware as delivered in the initial installation has an omni-directional transceiver, which has the capacity to handle some initial capacity. Once the utilized capacity surpasses that number, the network service quality for all users will be affected. One solution to this problem, as well known to those in the art, is to partition the sectors serviced by the transceiver. Each sector's transceivers would have the capacity of the omni-directional transceiver, such that the sectoring of coverage would result in a base station having the ability to handle some increased capacity. In one more example embodiment, the network supervision and management device 156 upon examination of the historical data predicts when the available capacity of the base station will be reached. At some point in time prior to this a notification to the broadband wireless carrier may be sent and a request for instructions as to the upgrade of the base station's transceiver will be made by the broadband wireless carrier. In yet one more example embodiment, the on site service call is scheduled automatically, without intervention by the broadband wireless carrier. A communication is made from the network supervision and management device 156 to a provisioning management device 157 that such a service will be performed and the broadband wireless carrier will be automatically invoiced for the upgrade charge.

In one more example embodiment, the system module 310 further includes an upgrade functionality. The system module 310 can monitor the current version of the hardware or software installed in the base station 105 and can request a hardware or software upgrade when such version becomes outdated. In still another example embodiment, the network supervision and management device 156 at the NOC monitors the current hardware or software version of all base stations. The network supervision and management device 156 being apprised of a hardware or software upgrade being made available will initiate the upgrade of base station hardware or software affected. In yet one more example embodiment, this upgrade occurs automatically, without any broadband wireless carrier intervention. In another example embodiment, management of this upgrade process is performed centrally, such as at a NOC 150 by a network supervision and management device 156. In accordance with yet still another example embodiment, management of this upgrade process is distributed to the various broadband wireless carriers. In yet still another example embodiment, the network and supervision management device can remotely alter the configuration file 123 of the base station.

In one other embodiment, a base station may act as a bridge between other base stations and a network point of presence. In such an arrangement, the bridge base station will only communicate with the network point of presence and the other base stations and will not be configured to service end user CPE unit's. Such a bridge base station is useful as wired network access may be unavailable or uneconomical at the location of currently deployed base stations.

Figure 4:
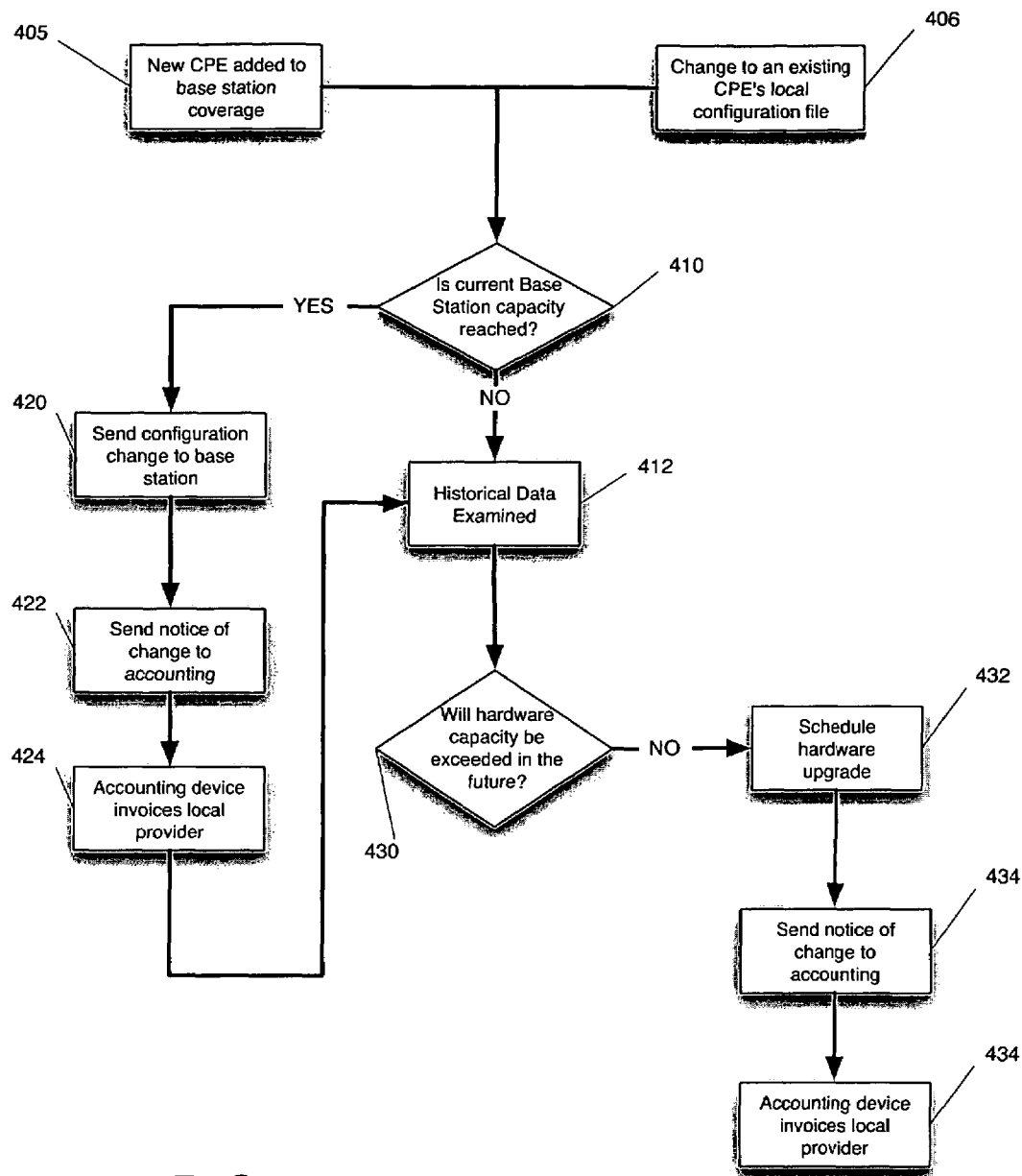
FIG. 4 is a flowchart of a method according to an embodiment of the inventive subject matter disclosed herein.

FIG. 4 provides a flowchart of a method according to an embodiment of the inventive subject matter disclosed herein for the process when a change in the configuration file of either a CPE unit 120 or a base station 105 is requested. There are two inputs to this method, a change in the local configuration file of a CPE unit 120 as initiated 405 by the end user, and a change 406 in the base station configuration file of a base station 105. This may be initiated by the network supervision and management device 156 due to the addition of a new CPE unit 120 to those being provided service from the base station 120. A determination at 410 as to whether there is capacity in the base station 105 to handle the change or the addition is made. In one more example embodiment, changed capacity is compared against available capacity, such that the last change monitored by the network supervision and management device 156 has consumed the capacity of the base station 105 to provide service. In another embodiment, changed capacity is compared against some capacity less then the available capacity, such that the implementation of the change would not result in the required capacity exceeding the available capacity of the base station 105. If the determination is made that a change will be required, at 420 the network supervision and management device 156 will change the configuration file 103 of the base station 105 it maintains and send the updated configuration file to the base station 105.

Upon a change to the configuration file 103 of the base station 105, at 422 a message generated by the network supervision and management device 156 to a provisioning management device will be sent. This message will inform the provisioning management device of the change in service, such that the required fees for the upgraded service will be invoiced in the next regular billing cycle, such as at 424. In still another example embodiment, an invoice will be sent immediately to the broadband wireless carrier requiring remittance of the fees for the upgraded service. At 412 if the base station's capacity or some other limit hasn't been reached, the network supervision and management device 156 will examine historical data. This historical data will provide to the network supervision and management device 156 a trend in user configuration changes or CPE unit additions, such that a prediction may be made as to when the hardware capacity of the base station 105 will be reached. At 430 a prediction is made as to when such hardware capacity will be reached. At 432, the network supervision and management device 156 will automatically schedule the hardware upgrade. At 434, the network supervision and management device 156 will send a notice of the change to the provisioning management device which will invoice the broadband wireless carrier at 434 for the change in service. In yet one more example embodiment, the prediction at 430 that the capacity will be reached will cause a message to the provisioning management device so that an invoice for the upgrade will be sent, such that the hardware upgrade will not be scheduled until payment for increased service has been made.

In yet one more example embodiment of the inventive subject matter disclosed herein, the service provider provides an easily deployable service to the local service provider enabling the local service provider to quickly deploy a network connectivity solution to end customers. This service provides for incremental and proportional operating costs as well as incremental rollout and capacity upgrade. This incremental cost model helps ensure that the broadband wireless carrier achieves operating profitability much quicker then in traditional models. By tying the operating costs associated with deploying such a service to the local service providers' end users or end user's capacity utilization, or to the number of end users that are currently using the service, a margin of profit may be maintained from the initial rollout of service to the local service providers' end user customers through many generations of client access license upgrades and the like. In one more example embodiment, the low cost feature of the base station is enabled by using a base station that is inexpensive relative to traditionally deployed base stations. Traditional deployments bundle a large suite of capabilities into the base station itself. These include, but are not limited to, client access authentication, bandwidth management, quality of service management, end user policy management and the like. To enable these services the base station requires significant processing power, which also in turn means the base station is an expensive investment for the broadband wireless carrier. In the inventive subject matter disclosed herein, most of the functionality of the base station is to be distributed to the end user CPE unit. In the inventive subject matter disclosed herein, the base station performs limited authentication tasks, and mainly acts as a wireless router. The CPE unit 120 and the NOC perform authentication. The CPE unit 120 manages its own policy, which includes, but is not limited to, bandwidth management, quality of service settings, class of service settings and the like. As such, a base station according to the teachings of the inventive subject matter disclosed herein is inexpensive relative to the cost of a base station that incorporates all of these capabilities, both in capital investment dollars and actual processing performance needs. In another example embodiment, the policy management as to bandwidth management includes burst bandwidth and maximum bandwidth, which are measured and controlled at the CPE unit level. At the base station 105, many solutions as to bandwidth management will be known to those skilled in the art, but all of those solutions require processing power and additional cost at the base station 105. It should be noted that any additional cost associated with the installation of the base station 105 will result in a longer return on investment, which in turn requires that a larger business case be made before the broadband wireless carrier can justify the capital expenditure.

In one more example embodiment of the inventive subject matter disclosed herein, it will be understood by those skilled in the art that the broadband wireless carrier may also be the local service provider. However, the broadband wireless carrier is not necessarily the local service provider and this system allows the broadband wireless carrier to commingle different local service providers on a single base station 105. This provides flexibility and additional marketing possibilities for the service offered by the broadband wireless carrier. The broadband wireless carrier provides manufacturing and fulfillment capabilities to the local service providers. A customer wishing to sign up for service will contract with a local service provider. The local service provider will generate an order for a CPE unit 120 to be delivered to the customer and arrange a time when the CPE unit 120 may be installed. In yet one more example embodiment, the CPE unit 120 may be delivered and installed without any service personnel being present at the user location and the end user customer can install the CPE unit. In such an example, the CPE unit 120 will auto-configure itself on power-up, associate with the base station 105 and attempt to authenticate to the network supervision and management device 156. In still another example embodiment, a part of such authentication could be the display of a web browseable user interface on the end user's computer, prompting the user to provide such user authentication details as is required to sign up for service. In such an example, the user will authenticate their System Account ID, which may be provided by the local service provider, to the network supervision and management device. Following the System Account ID authentication of a newly installed CPE unit, the network supervision and management device will provide, among other things, a configuration file containing CPE unit 120 configuration commensurate with the level of service the user has purchased. In accordance with yet still another example embodiment, a hardware or software upgrade file is also sent. The hardware upgrade file may be sent to the CPE unit 120 if the shipped hardware version of the CPE unit 120 is earlier than that of what the network supervision and management device 156 maintains for a CPE unit 120 of that type. The CPE unit 120 will install any hardware upgrades and configuration files 123 and be ready for use by the end user.

In yet still another example embodiment, a new user can install a new CPE unit 120 at their location. They will power up the new CPE unit. The CPE unit 120 will have no configuration file 123 pre-installed. In yet one more example embodiment, the CPE unit 120 will have a limited configuration file 123 pre-installed. The CPE unit 120 will cause to be displayed via the user interface module, a web browseable user interface to the end user on the end user's computer. The user will authenticate their System Account ID to the network supervision and management device at the NOC. Upon a successful authentication, the network supervision and management device will cause to be downloaded to the CPE unit 120 a configuration file 123. The CPE unit 120 will download such a file and re-initialize its configuration file 123 and be ready for use by the end user customer. In one more example embodiment, the System Account ID authentication occurs on the service layer of the network, which is a reserved portion of the network. In such an example, no authentication of packets will take place at the base station and such communication will be made from the CPE unit 120 and routed only onto a network port on the network supervision and management device 156. Following a successful authentication, the CPE unit 120 will be able to communicate other types of network traffic with the base station, such that traffic following successful authentication will be encrypted traffic between the CPE unit 120 and the base station.

In another example embodiment, an end user may wish to upgrade the configuration file 123 of their CPE unit. In still another example embodiment, the local service provider of the end user will have preset a set of service offerings. These presets will include any parameterization of the user experience, as described above. The end user will cause to be made a change to the configuration file 123 of the CPE unit via a web browseable interface. The CPE unit will communication to the network supervision and management device. In yet another example embodiment, the communication will include the uploading of the new configuration file 123 to the network supervision and management device 156. In yet still another example embodiment, the communication will include the uploading of only the changes to the configuration file 123 to the network supervision and management device 156. The CPE unit will then initiate a configuration request of the network supervision and management device. The network supervision and management device 156 provides a modified configuration file 123, based on the configuration file 123-$o$, such that the CPE unit can download such a file. Upon a successful download of such a file, the CPE unit will re-initialize the configuration file 123 with the modified settings and in turn be now configured to communicate on the network with the level of the service that the end user has self-selected sometime after the initial installation of the CPE unit 120 at their location. In still another example embodiment, a change to the configuration file will cause a communication from the network supervision and management device to the provisioning management device. The provisioning management device will in turn communicate the change in service level to the local service provider, such that the end user may be appropriately billed.

In one more example embodiment, a broadband wireless carrier or local service provider may predefine levels of service. The level of service will include preset configurations. Such levels of service might be silver, gold or platinum. In such an example, bandwidth settings for a gold level of service may be higher then a silver level of service. In such an arrangement, the user performing an upgrade to their level of service via the web browseable interface of the CPE unit will only be allowed to choose between these predefined levels of service. In one example alternative embodiment, the user will not be able to individually set the various parameters enforced by the configuration file.

In accordance with yet still another example embodiment of the business model according to the teachings of the inventive subject matter disclosed herein, the following are provided for: commingling of end user types; commingling of local service providers; base stations that are inexpensive in relation to more costly, and traditional, base stations; distributing the capabilities traditionally performed by the base station to the end user CPE units; CPE units that are rented or leased by the end user; sharing a NOC by many different broadband wireless carriers; policy enforcement at the edge of the network; and a call center that can respond to end user problems, that is shared by the system's many local service providers. In yet one more example embodiment, an end user problem may be directed to an alternate call center if the primary call center has ceased operations for a period of time. In yet another example embodiment, the call center may be provided for by the local service provider. In still another example embodiment, the call center may be a contracted service performed by an organization other then the local service provider.

In another example embodiment of the inventive subject matter disclosed herein, the system allows for end user commingling. End user commingling can be defined as physical commingling of different end user types with functional separation through application of security and enforceable service policies for each user.

In yet still another example embodiment of the inventive subject matter disclosed herein, the system allows for local service provider commingling. Local service provider commingling, can be defined as physical commingling of broadband service providers i.e. local service providers with functional separation through allocation of each user to only one provider and by providing an end user management interface including only the providers own customers for each provider.

Policy based end user service level is enforced at the CPE unit but created maintained and archived in the NOC center server. This creates a benefit of reducing the need for capabilities in the base station thereby reducing the fixed installation cost for a base station cell.

In accordance with yet still another example embodiment of the inventive subject matter disclosed herein, the system allows for centrally storing and automatically deploying service level policy objects. This allows the service level policies to be centrally stored and managed but enforced at the network edge were the enforcement has the biggest impact.

In one more example embodiment of the inventive subject matter disclosed herein, the system allows for managing the Quality of Service (QoS) based on end user service level policy enforced at the network edge CPE unit.

In still another example embodiment of the inventive subject matter disclosed herein, the system allows for centralized automatic software upgrade deployment and testing.

In yet another example embodiment of the inventive subject matter disclosed herein, the system allows for the incremental implementation and operations cost business model offering allowing the last miles carrier, or broadband wireless carrier, to proof the commercial viability of one cell site within a short time frame thereby greatly reducing business risk.

In another example embodiment of the inventive subject matter disclosed herein, the system allows for automatic and predictive Client Access License (CAL) and hardware upgrade supervision, provisioning and billing. This function allows the broadband wireless carrier to install a base station for a low price with a limited CAL and then, through the NMU system automatically predict the need for base station capacity and automatically upgrade CAL level and automatically procure hardware for base station expansion. In a further embodiment of the inventive subject matter disclosed herein, the system automatically supervises Base Station capacity utilization and upgrade needs through aggregate of service level policies attached to the BS. In a further embodiment of the inventive subject matter disclosed herein, the system automatically supervises base station capacity relative upgrade needs through statistical evaluation of actual traffic. In a further embodiment of the inventive subject matter disclosed herein, the system automatically transfers an end user service problem notification and alarm actuation to alternative management and call centers based on calendar and time as well as problem severity level.

Figure 5:
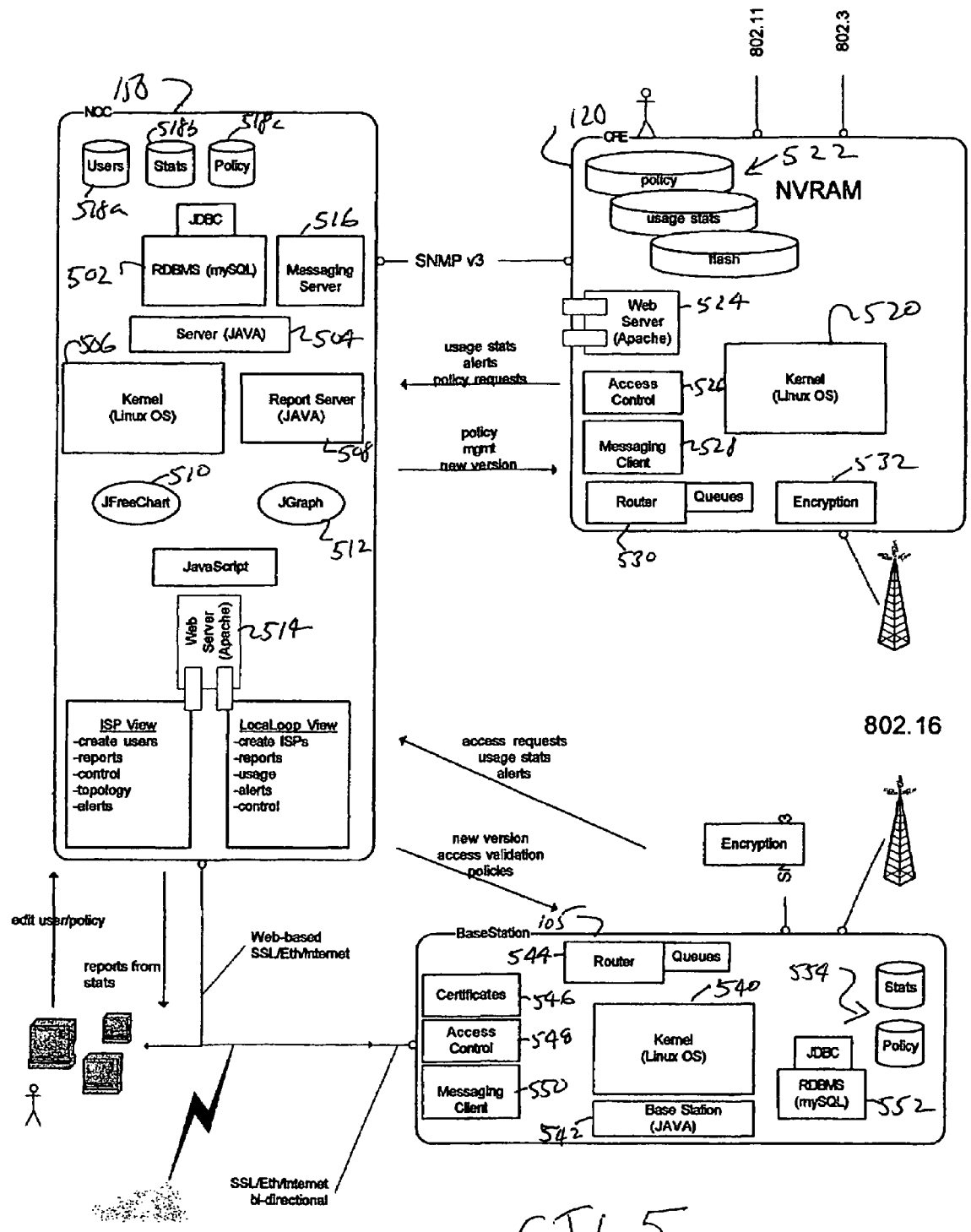
FIG. 5 is an exemplary schematic illustration of a system according to the inventive subject matter disclosed herein.

Referring now to FIG. 5, there is illustrated one example embodiment of a system 500 according to the inventive subject matter herein. As illustrated in FIG. 5, there is provided a NOC 150, a CPE unit 120 and a base station 105. NOC 150 includes a database management system 502, an application server 504, an operating system 506 (for example Linux), a report server 508, a chart module 510 and graphs module 512, a web server 514 (for example the Apache server) to support a user interface (using for instance java script), a messaging server 516, and data repositories 518a, 518b and 518c, for users, network stats and access policy.

CPE unit 120 includes an operating system 520 (for instance Linux), data processes 522 for policy, usage stats, and flash prom management, a web server 524 to support a user interface, an access control module 526, a messaging client 528, a router 530 with queue management, and an encryption module 532.

Base station 105 includes a an operating system 540 (for example Linux), a base station manager application 542, a router 544 with queue management, a certificates module 546 (for managing CALs), an access control module 548, a messaging client 550, a relational database management system 552 (providing JAVA database connectivity), and a data repository 554 for usage statistics and access policies.

As further illustrated, NOC 150 and CPE unit 120 or base station 105 may communicate through, for example, a simple network management protocol (for instance SNMP v3) with protocol additions particular to the present invention. Such communications may be encrypted. Access to the NOC 150 or base station 105 may be provided through secure socket layer (SSL)/Eth/Internet.

Figure 6:
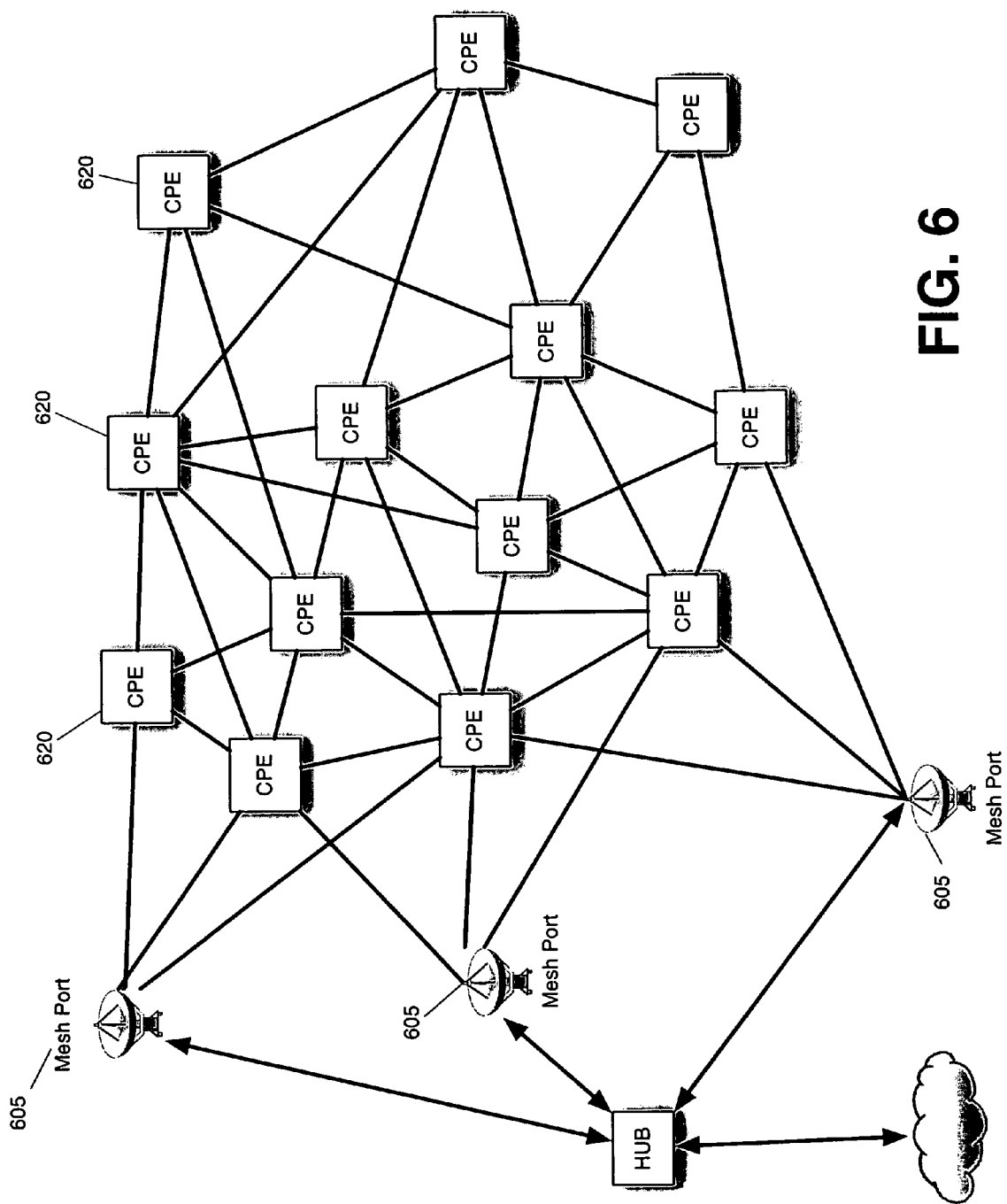
FIG. 6 is a simple block diagram of a device according to a mesh network embodiment of the inventive subject matter disclosed herein.

Referring to FIG. 6, there is shown a mesh embodiment according to one example embodiment of the inventive subject matter herein. In FIG. 6, there is provided a CPE unit 620 which includes all the functionality of CPE unit 120 with the additional capability of receiving data packet transmission wirelessly from a mesh port 605 or a CPE unit 620 and re-routing and re-transmitting said data package to same or different CPE unit 620 or mesh port 605 according to any suitable mesh network routing protocol. The mesh port 605 has all the functions of the base station 105 and in addition is capable of receiving data packet transmission wirelessly from a mesh port 605 or a CPE unit 620 and re-routing and re-transmitting said data package to same or different CPE unit 620 or mesh port 605 according to any suitable mesh network routing protocol.

Referring to FIG. 7, there is illustrated the advantageous capacity utilization and cost for the system and method of the inventive subject matter disclosed herein. Step function 704 models the traditional capacity and cost profile of conventional broadband wireless carrier system, wherein the initial capacity and cost are high, and utilization is low. This is contrasted with the capacity and cost profile 706 according to the inventive subject matter herein, wherein capacity and cost are scaled to utilization 708 both initially and throughout the life cycle of the system.

In yet one more example embodiment, the network as described above may be deployed without the installation of any base stations. Such an arrangement may be made by use of a mesh network, which is known in the art. In such an arrangement, each CPE unit acts as a point in the mesh, forwarding packet traffic along the network. The CPE unit will forward such packet traffic without regard to the authenticated nature of such traffic. A high density of CPE unit's in an area would allow for a system of self-healing network connectivity. In yet still another example embodiment, the mesh network would receive data from at least one data transmission node device. In still another example embodiment, such a data transmission node device may be a base station at the edge of such a mesh network arrangement.

In accordance with yet still another example embodiment, the network as described above may be deployed in a wireline environment. In such an example, all communications between base stations and CPE unit's, or amongst CPE unit's, in the case of a mesh network, would occur over a wired communications link.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings may be combined to form additional embodiments of the present application. The scope of the invention should, therefore, be determined with reference to the appended claims, along with the full scope of equivalents to which such claims are entitled.

Thus, according to various ones of the embodiments described herein, a base station 105 having relatively minimal complexity, may be purchased by a broadband wireless carrier for a relatively modest capital investment relative to base stations that perform many or more sophisticated and extensive functions. This, in turn, allows the broadband wireless carrier to achieve a relatively quick return on their investment as the CPE units may be deployed on an as needed basis, and thereby allowing the broadband wireless carrier to return an operating profit quicker then the provider might in traditional network deployments.

What is claimed is:

1. A method comprising: deploying a broadband wireless network connecting a plurality of CPE units to an access point for the Internet;
   wherein the broadband wireless network includes at least one data transmission node and a plurality of CPE units, wherein network data traffic passes through the data transmission node and the CPE units;
   wherein there is a wireless data link at least in part between the data transmission node and the CPE units;
   the data transmission node connecting the CPE units to the access point for the Internet so that data streams flow between the CPE units and the Internet;
   the CPE units connected to at least one network provisioning system and receiving provisioning from the network provisioning system;
   wherein data flows between the CPE units to the access point for the Internet have at least the attributes of bandwidth and quality of service, wherein the bandwidth and quality of service is at least in part affected by the prioritization or queuing of the data streams passing through the CPE units so that the CPE units can at least in part control network traffic to and from the CPE units;
   the data transmission node including a gateway unit that is adapted to establish an authorized data path between individual ones of the CPE units and the gateway unit at least in part in response to instructions received from the network provisioning system;
   wherein the CPE units are adapted to perform authorization, authentication, and data stream prioritization or queuing, so that the CPE units can be individually authorized and authenticated by the network provisioning system and wherein the CPE units are provisioned by the network provisioning system with one or more parameters controlling at least one attribute of data stream prioritization or queuing performed by the CPE units;
   further wherein the gateway unit is not required to perform data stream prioritization or queuing to control the flow of data between the CPE units and the Internet;
   further wherein the management and configuration of the network is managed centrally from the network provisioning system and authorization, authentication, data stream prioritization or queuing is accomplished through the operation of the CPE units, and further wherein a broadband wireless carrier can remotely manage and control the network using the network provisioning system; and
   further wherein the broadband wireless network is initially deployed with at least one gateway unit and at least one network provisioning system, and CPE units are added to the network substantially incrementally so that the capability to control the network data traffic is added to the broadband wireless network substantially incrementally as opposed to being a capability required by the gateway unit when the network is initially deployed.

2. Apparatus comprising: a broadband wireless network connecting a plurality of CPE units to an access point for the Internet;
   broadband wireless network including at least one data transmission node and a plurality of CPE units, wherein network data traffic passes through the data transmission node and the CPE units;
   a wireless data link at least in part between the data transmission node and the CPE units;
   the data transmission node connecting the CPE units to the access point for the Internet so that data streams flow between the CPE units and the Internet;
   the CPE units connected to at least one network provisioning system and receiving provisioning from the network provisioning system;
   wherein data flows between the CPE units to the access point for the Internet have at least the attributes of bandwidth and quality of service, wherein the bandwidth and quality of service is at least in part affected by the prioritization or queuing of the data streams passing through the CPE units so that the CPE units can at least in part control network traffic to and from the CPE units;
   the data transmission node including a gateway unit that is adapted to establish an authorized data path between individual ones of the CPE units and the gateway unit at least in part in response to instructions received from the network provisioning system;
   wherein the CPE units are adapted to perform authorization, authentication, and data stream prioritization or queuing, so that the CPE units can be individually authorized and authenticated by the network provisioning system and wherein the CPE units are provisioned by the network provisioning system with one or more parameters controlling at least one attribute of data stream prioritization or queuing performed by the CPE units;
   further wherein the gateway unit is not required to perform data stream prioritization or queuing to control the flow of data between the CPE units and the Internet;
   so that the management and configuration of the network can be managed centrally from the network provisioning system and authorization, authentication, data stream prioritization or queuing is accomplished through the operation of the CPE units, and a broadband wireless carrier can remotely manage and control the network using the network provisioning system; and
   so that the broadband wireless network can be initially deployed with at least one gateway unit and at least one network provisioning system, and CPE units can be added to the network substantially incrementally so that the capability to control the network data traffic is added to the broadband wireless network substantially incrementally as opposed to being a capability required by the gateway unit when the network is initially deployed.

3. Apparatus comprising: a broadband wireless network connecting a plurality of CPE units to an access point for the Internet;
broadband wireless network including at least one data transmission node and a plurality of CPE units, wherein network data traffic passes through the data transmission node and the CPE units;
a wireless data link at least in part between the data transmission node and the CPE units;
the data transmission node connecting the CPE units to the access point for the Internet so that data streams flow between the CPE units and the Internet;
the CPE units connected to at least one network provisioning system and receiving provisioning from the network provisioning system;
wherein data flows between the CPE units to the access point for the Internet have at least the attributes of bandwidth and quality of service, wherein the bandwidth and quality of service is at least in part affected by the prioritization or queuing of the data streams passing through the CPE units so that the CPE units can at least in part control network traffic to and from the CPE units;
the data transmission node including a gateway unit that is adapted to establish an authorized data path between individual ones of the CPE units and the gateway unit at least in part in response to instructions received from the network provisioning system;
wherein the CPE units are adapted to perform authorization, authentication, and data stream prioritization or queuing, so that the CPE units can be individually authorized and authenticated by the network provisioning system and wherein the CPE units are provisioned by the network provisioning system with one or more parameters controlling at least one attribute of data stream prioritization or queuing performed by the CPE units;
further wherein the gateway unit is not required to perform data stream prioritization or queuing to control the flow of data between the CPE units and the Internet;
so that the management and configuration of the network can be managed centrally from the network provisioning system and authorization, authentication, data stream prioritization or queuing is accomplished through the operation of the CPE units, and a broadband wireless carrier can remotely manage and control the network using the network provisioning system;
so that the broadband wireless network can be initially deployed with at least one gateway unit and at least one network provisioning system, and CPE units can be added to the network substantially incrementally so that the capability to control the network data traffic is added to the broadband wireless network substantially incrementally as opposed to being a capability required by the gateway unit when the network is initially deployed; and
wherein the data transmission node is capable of supporting a first capacity of broadband wireless access, and further wherein the data transmission node is initially provided to a broadband wireless carrier so as to be limited to supporting a second capacity of broadband wireless access that is less than the first capacity, and can be configured to support more than the second capacity of broadband wireless access.

4. Apparatus according to claim 3 further wherein the data transmission node is adapted to be configured remotely for levels of broadband wireless access.

5. Apparatus according to claim 3 further wherein the data transmission node is adapted to be configured on-site for levels of broadband wireless access.

6. Apparatus according to claim 3 further wherein the data transmission node is adapted to provide routing capability.

7. Apparatus according to claim 3 further including a system adapted to automatically determine when an upgrade from supporting a first capacity of broadband wireless access to a configuration to support a larger capacity is required.

8. Apparatus according to claim 3 further including a system adapted to determine the need for an upgrade based on the aggregate of the capacity allocated to the CPE units.

9. Apparatus according to claim 3 further including a system adapted to determine the need for an upgrade based on a multivariable function including parameters representing at least two of capacity, quality of service, bandwidth, number of subscribers and data stream priority and queuing.

* * * * *